(12) United States Patent
Loh et al.

(10) Patent No.: US 6,322,160 B1
(45) Date of Patent: Nov. 27, 2001

(54) METHOD AND APPARATUS FOR ATTENUATING BRAKE-INDUCED VIBRATIONS

(75) Inventors: Wei-Yi Loh, Novi; Isiah Charles White, Ypsilanti; Weiping Zhu, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/547,453

(22) Filed: Apr. 12, 2000

(51) Int. Cl.[7] .................................................. B60T 17/04
(52) U.S. Cl. ............................................................ 303/87
(58) Field of Search ................................. 303/87; 138/37

(56) References Cited

U.S. PATENT DOCUMENTS

| | | | |
|---|---|---|---|
| 3,430,660 | | 3/1969 | Mitton ..................................... 138/30 |
| 3,757,825 | | 9/1973 | Givens et al. ........................... 138/26 |
| 4,166,655 | | 9/1979 | Spero ...................................... 303/87 |
| 4,203,628 | * | 5/1980 | Ohta et al. ............................ 303/6 C |
| 4,998,609 | * | 3/1992 | Nix et al. ............................. 192/109 F |
| 5,161,864 | | 11/1992 | Cardenas et al. ....................... 303/87 |
| 5,320,203 | * | 6/1994 | Wilber et al. ...................... 192/109 F |
| 5,390,989 | * | 2/1995 | Kim ........................................ 303/87 |
| 5,410,945 | | 5/1995 | Schops et al. ............................. 92/48 |
| 5,618,085 | * | 4/1997 | Siegel et al. ........................ 303/113.1 |
| 5,664,848 | * | 9/1997 | Muraski .................................. 303/87 |
| 5,682,923 | * | 11/1997 | Goloff et al. ........................... 138/30 |
| 5,735,314 | * | 4/1998 | Alaze et al. ............................ 138/31 |
| 5,803,555 | * | 9/1998 | Schaefer ................................. 303/87 |
| 5,820,227 | | 10/1998 | Spero ...................................... 303/87 |
| 6,017,099 | * | 1/2000 | Schneider et al. ..................... 303/87 |

* cited by examiner

Primary Examiner—Robert J. Oberleitner
Assistant Examiner—Xuan Lan Nguyen
(74) Attorney, Agent, or Firm—Gregory P. Brown; William J. Coughlin

(57) ABSTRACT

A damper (40) for damping tactile vibration (FIG. 4) caused by pressure changes induced in hydraulic fluid by an operational characteristic of a hydraulic-operated brake (22; 24) when the brake is braking a rotating object (14; 16). A piston (54) is displaceable within a housing bore (52) and divides the bore into a first chamber (56) confronting one axial face of the piston and a second chamber (58) confronting an opposite axial face of the piston. A port (59) communicates hydraulic fluid to the first chamber such that increasing hydraulic fluid pressure is effective to displace the piston toward the second chamber. A spring (60) that is operated by displacement of the piston within the bore resists piston displacement toward the second chamber as hydraulic fluid pressure increases and aids piston displacement toward the first chamber as hydraulic fluid pressure decreases. The invention is useful in hydraulic-operated motor vehicle brakes.

14 Claims, 2 Drawing Sheets

METHOD AND APPARATUS FOR ATTENUATING BRAKE-INDUCED VIBRATIONS

BACKGROUND OF THE INVENTION

1. Field of the Invention

This invention relates to a hydraulic-actuated brake system, especially to a method and an apparatus for damping tactile vibration caused by changes in hydraulic fluid pressure induced in the hydraulic fluid by an operational characteristic of a brake when the brake is being applied to brake a rotating object, such as a wheel of a motor vehicle.

2. Background Information

Hydraulic-actuated brake systems are used extensively as service brakes of motor vehicles. A representative brake system comprises friction brakes at individual wheels. Application of the brakes occurs when the plunger of a brake master cylinder is depressed by a driver of the vehicle pushing on a brake foot pedal. Hydraulic fluid is displaced from the master cylinder to the individual brakes at the individual wheels. The magnitude of hydraulic fluid pressure correlates with the degree to which the brakes are being applied, possibly being amplified by a power brake booster. Generally speaking, the more forcefully the brakes are being applied, the greater the pressure in the hydraulic fluid.

An example of a friction brake mechanism in a motor vehicle is a disc brake where friction pads are pressed against opposite faces of a brake rotor when the brake mechanism is operated by depression of the master cylinder plunger. Because the rotor is turning with the vehicle wheel, the forces applied by the pads to the rotor are effective to brake the rotating wheel, and hence slow the vehicle when the vehicle is moving.

Certain friction brake mechanisms may possess certain operational characteristics that induce pressure changes, or fluctuations, in the hydraulic fluid as they are being operated to apply the brakes. Certain brake-induced pressure changes cause tactile vibration, sometimes referred to as brake roughness or shudder, which may propagate within the vehicle to be sensed by a driver of the vehicle, who may deem the vibration objectionable, even when it has no bearing on the functionality of the brake system or any other vehicle system. For example, vibration may be transmitted to the steering wheel where the driver may feel it through his or her grasp of the steering wheel. Such tactile vibration may manifest itself as torsional vibration. To promote driver satisfaction with a vehicle, it is therefore desirable that a brake system be free of such potential sources of objection, and it is toward that end that the present invention is directed. The invention may also serve to avoid needless warranty and/or repair expenses.

A cause of brake-induced vibration may arise from the nature of the brake mechanism itself. In a motor vehicle that has disc brakes, a cause may be a small divergence of opposite faces of a disc brake rotor from parallelism, even though the respective surfaces of the faces may be perfectly flat. Such divergence creates small differences in the distance between the opposite rotor faces, i.e. rotor thickness, as measured at various locations around the circumference of the rotor. Such differences may replicate a function that is a sinusoidal function of their locations around 360° of the rotor circumference.

When opposing pads of a disc brake are pressed against opposite rotor faces, the small non-parallelism of those faces may induce vibration in the pads that is in turn reflected as pressure fluctuations in the hydraulic fluid. Such fluctuations may be more noticeable when the brakes are being lightly applied, such as to gently slow a moving vehicle, in contrast to more forceful applications, like hard braking for stopping the vehicle. And as observed above, vibration may propagate within the vehicle and be felt by the driver.

As a practical matter, it may not be cost-effective to impose stricter manufacturing tolerances on a disc brake rotor for the purpose of reducing the possible degree of non-parallelism between opposite faces, and consequently it is believed that the present invention may provide a better solution.

A preliminary novelty search developed the following U.S. Pat. Nos.: 3,430,660; 3,757,825; 4,166,655; 5,165,864; 5,410,945; and 5,820,227. Certain of those patents are concerned with avoiding wheel lock-up during hard braking, and none is seen to address the phenomenon with which the present invention is concerned, much less provide a solution for attenuating possibly objectionable brake-induced tactile vibration to levels that are likely not to be deemed objectionable.

SUMMARY OF THE INVENTION

One general aspect of the invention relates to a hydraulic brake system for braking a rotating object. The brake is operated by the displacement of hydraulic fluid from an actuator to the brake, and a damper is associated with a hydraulic line to the brake for damping tactile vibration caused by pressure changes induced in the hydraulic fluid by an operational characteristic of the brake when the brake is braking the rotating object. The damper comprises a housing comprising a bore and a piston that is displaceable within the bore and that divides the bore into a first chamber confronting one axial face of the piston and a second chamber confronting an opposite axial face of the piston. The housing comprises a port that communicates the hydraulic fluid to the first chamber such that increasing hydraulic fluid pressure is effective to displace the piston toward the second chamber. A spring is operated by displacement of the piston within the bore to resist piston displacement toward the second chamber as hydraulic fluid pressure increases and to aid piston displacement toward the first chamber as hydraulic fluid pressure decreases.

Another general aspect of the invention relates to a method for attenuating tactile vibration caused by hydraulic fluid pressure changes induced in a hydraulic brake system by a characteristic of a hydraulic-operated brake when the brake is being actuated to apply brake torque to a rotating object. The method comprises communicating a damper to the hydraulic fluid such that the hydraulic fluid can act on a face of a piston that is displaceable within a bore of the damper, and attenuating the vibration within a frequency range of interest by using a spring to resist piston displacement in one direction within the bore as hydraulic fluid pressure increases and to aid piston displacement in an opposite direction within the bore as hydraulic fluid pressure decreases.

Further aspects will be seen in various features of a presently preferred embodiment of the invention that will be described in detail and in principles of the invention as set forth in various claims.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT(S)

Figure 1:
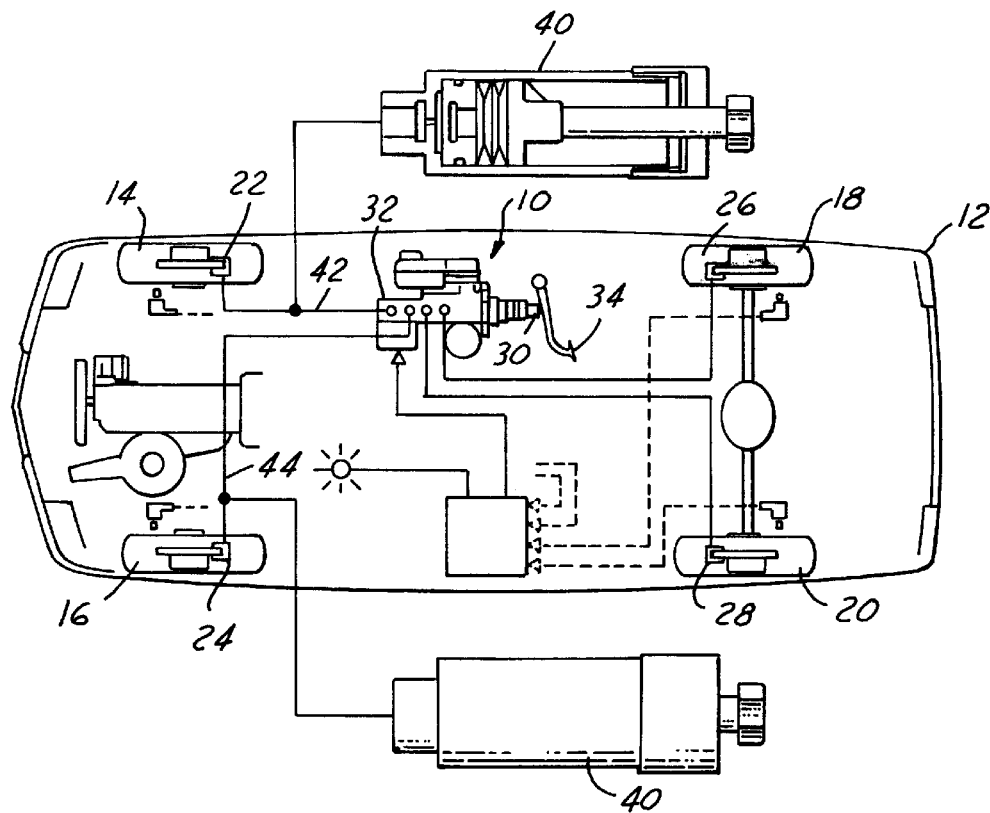
FIG. 1 is a general schematic diagram of a representative motor vehicle hydraulic brake system, including apparatus for practicing principles of the present invention.

FIG. 1 shows a representative service brake system 10 of a motor vehicle 12 which has two front wheels 14, 16, and two rear wheels 18, 20. Brake system 10 comprises a respective hydraulic-actuated friction brake 22, 24, 26, 28 at each respective wheel 14, 16, 18, 20. Brakes 22, 24, 26, 28 are applied when the plunger 30 of a brake master cylinder 32 is depressed by a driver of the vehicle pushing on a brake foot pedal 34. Hydraulic fluid is displaced from master cylinder 32 through hydraulic brake lines to the individual brakes at the individual wheels. Hydraulic fluid pressure correlates generally with the degree to which the brakes are being applied.

At least some of the brakes comprise friction brake mechanisms in which friction pads are pressed against opposite faces of a brake rotor when plunger 30 is depressed. A disc brake rotor whose opposite faces, even though perfectly flat, diverge from parallelism as explained earlier, may induce tactile vibration, as also explained above.

Figure 2:
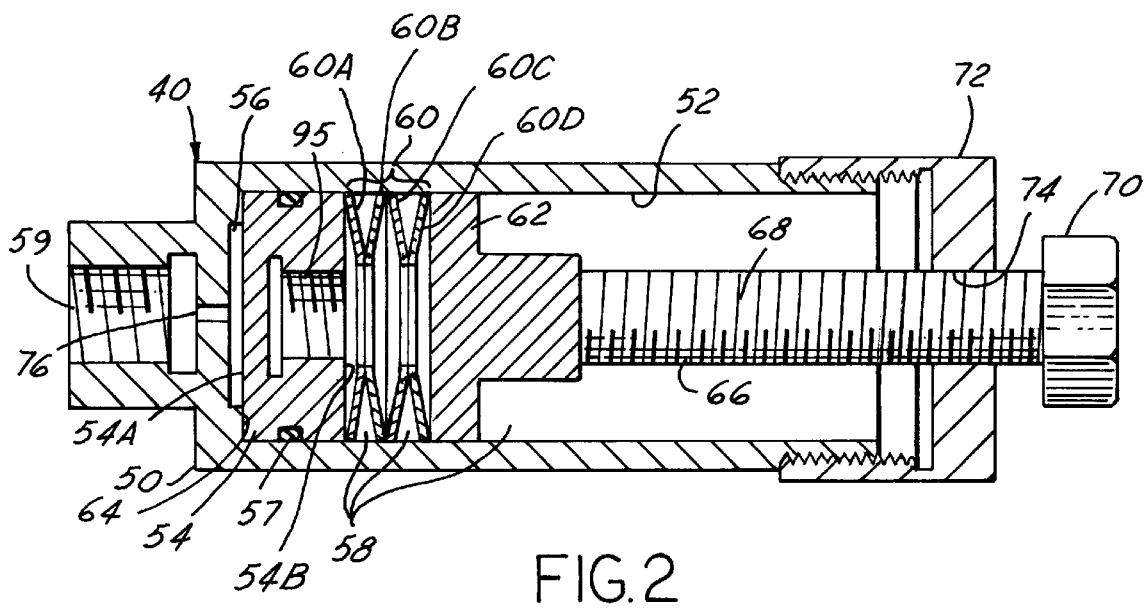
FIG. 2 is a longitudinal cross section view through a preferred embodiment of vibration damper associated with the brake system of FIG. 1, in accordance with principles of the present invention.

For attenuating such vibration, particularly any occurring when the brakes are being lightly applied such as during 0.15g–0.25g decelerations for example, a damper 40, like that shown in FIG. 2, may be associated with any hydraulic line to any of the brakes. FIG. 1 shows two such dampers 40, each associated with a respective hydraulic line 42, 44 to a respective disc brake 22, 24 for the front wheels 14, 16.

Damper 40 comprises, as shown in FIG. 2, a housing 50 comprising a circular cylindrical bore 52. A piston 54 is disposed for coaxial displacement within bore 52 and divides the bore into a first chamber 56 confronting one axial face 54A of the piston and a second chamber 58 confronting an opposite axial face 54B of the piston. Housing 50 comprises a port 59 that communicates hydraulic fluid in a hydraulic line, such as line 42 in the case of brake 22, to chamber 56 via a T-connection, as illustrated. An O-ring seal 57 seals the circular outside diameter of piston 54 to bore 52 As also illustrated, damper 40 is constructed and arranged to close chamber 56 except to port 59.

A spring 60 that is operated by displacement of piston 54 within bore 52 serves to damp such displacement occurring in consequence of brake-induced pressure fluctuations in the hydraulic fluid in the brake line and thereby damp such fluctuations and resulting tactile vibration that may propagate within the vehicle. The illustrated spring 60 comprises four individual frustoconical spring discs 60A, 60B, 60C, 60D, arranged axially seriatim, but with successive discs alternately facing. Hence, the outer perimeter of spring disc 60A bears against piston face 54B while its inner perimeter bears against the inner perimeter of spring disc 60B. The outer perimeters of spring discs 60B and 60C bear against each other, the inner perimeters of spring discs 60C and 60D bear against each other, and the outer perimeter of the latter bears against a stop 62 disposed within chamber 58 of bore 52.

FIG. 2 shows a condition of damper 40 where the outer margin of piston face 54A is in abutment with an internal shoulder 64 of bore 52, and spring 60 is being forced against piston face 54B by stop 62. Stop 62 is being held axially in the illustrated position by a screw 66 that is coaxial with bore 52. Screw 66 comprises a threaded shank 68 and a polygonally shaped head 70. A central neck of stop 62 contains a blind hole into which the distal end of shank 68 is threaded with locking tightness. At the axial end of housing 50 opposite port 59 a cap 72 is threaded onto the housing in closure of that end of the housing. The end wall of cap 72 contains a threaded through-hole 74 into which screw shank 68 is threaded, leaving screw head 70 external to bore 52.

When head 70 is engaged by a suitable tool (not shown) and the tool is turned to turn the head, screw 66 is displaced axially of the housing to thereby axially position stop 62 within bore 52. This provides an adjustment for establishing a desired preload force in spring 60 by setting the extent to which the spring is compressed between the piston and the stop in the absence of hydraulic fluid pressure communicated to chamber 56 via port 59.

Housing 50 further comprises a transverse internal wall between port 59 and chamber 56, and that wall contains an orifice 76 through which port 59 and chamber 56 communicate. The diameter of orifice 76 is larger than that of the hydraulic brake line. From the standpoint of kinematics, piston 54 represents an inertial mass on which various forces can act. Those forces comprise the force of spring 60, frictional force between O-ring seal 57 and bore 52, and the force of hydraulic fluid acting on piston face 54A.

Values of parameters like mass of piston 54 and preload force of spring 60 are chosen to achieve attenuation of hydraulic pressure fluctuation over a frequency range of interest. In the disclosed application of dampers to motor vehicle disc brakes, it is possible to attenuate brake-induced vibration at a frequency range of interest by selection of parameters through empirical and/or computational methods, without noticeably altering the feel of brake pedal operation, except for accomplishing the desired objective of attenuating objectionable vibration. In this regard, it is to be understood that while the porting of a damper to a brake line will result in shunting some of the hydraulic fluid into the damper while the brake is being applied, the amount shunted is sufficiently small that any increase in brake pedal travel will essentially go unnoticed by a driver in comparison to pedal travel without the damper. Hence, the damper is especially well suited for installation in pre-existing vehicles that are already in service, although the damper may of course be incorporated into a new vehicle at time of vehicle assembly. The relative compact size of the damper, its relative ease of installation, and the ability to adjust the preload spring force contribute in significant ways to its suitability for aftermarket installation in different vehicles.

Figure 3:
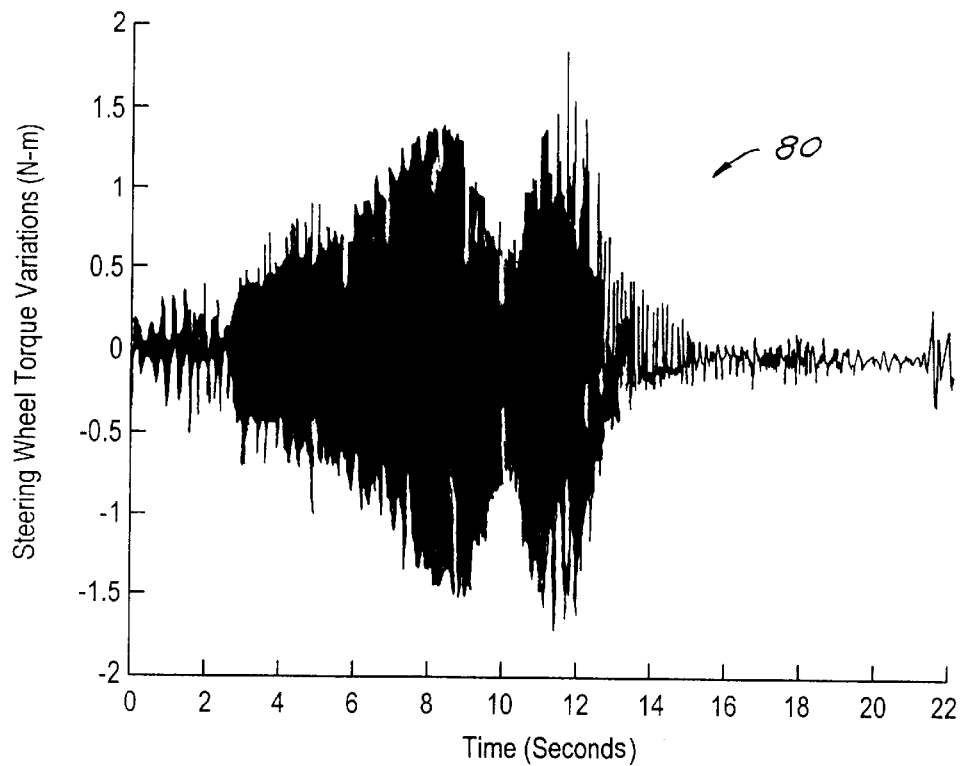
FIG. 3 is a representative graph plot of hydraulic vibration in a brake system that does not practice principles of the present invention.
Figure 4:
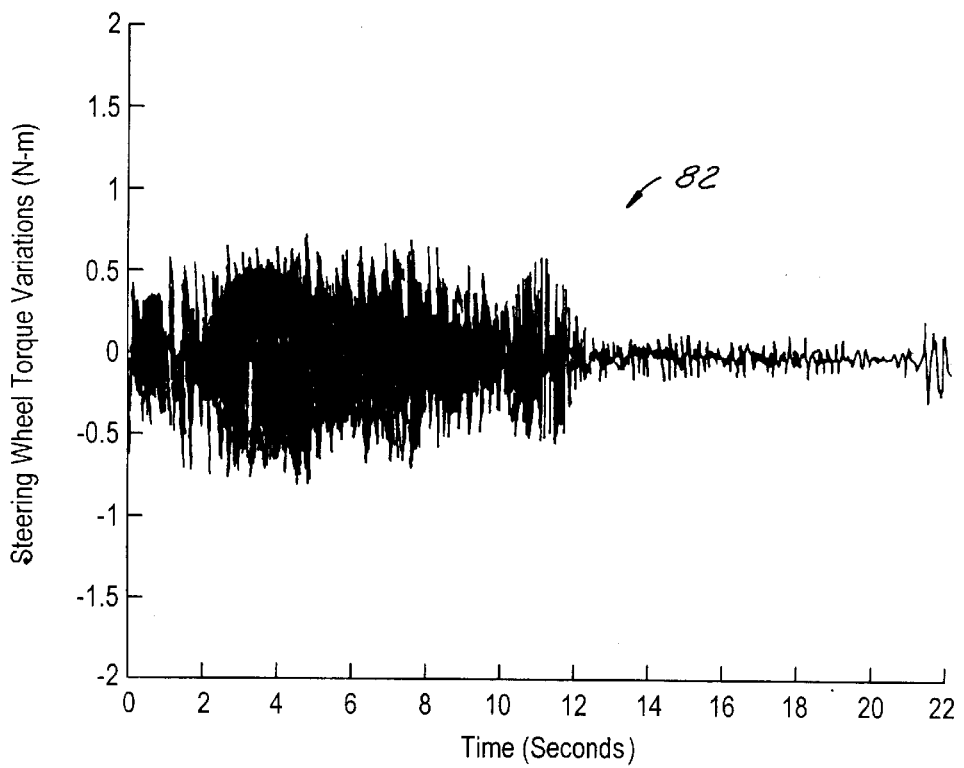
FIG. 4 is a representative graph plot of hydraulic vibration in the brake system mentioned in FIG. 3 when principles of the present invention are practiced.

For a graphic example of effectiveness of the invention, reference is made to FIGS. 3 and 4. Each Figure has a horizontal axis of time measured in seconds and a vertical axis of torsional steering wheel vibration measured in newton-meters. FIG. 3 depicts a trace 80 of vibration occurring in consequence of brake application in a vehicle lacking the inventive damper. FIG. 4 depicts a trace 82 with the inventive damper. Comparison of the two traces reveals that significant vibration attenuation is achieved when principles of the present invention are practiced. The spring is tuned to suitable frequency for absorbing the objectionable vibration. That frequency is significantly greater than the 10 hz. to 20 hz. frequency range that typifies brake line pressure changes in normal application and release of the brakes.

It is possible to disassemble damper 40 by unscrewing cap 70 from housing 50. After screw 66 has been unthreaded from cap 50, screw shank 68 may be introduced into bore 52 through the uncapped end of the housing, passed through the centers of spring discs 60A, 60B, 60C, 60D, and threaded into a blind hole 95 at the center of piston face 54B. Extraction of the screw will pull piston 54 and the spring discs out of the bore. The ability to disassemble the damper in this manner may however be inappropriate if there is concern that unskilled persons might tamper with the device. Hence, aftermarket embodiments may be designed to be tamperproof.

It is believed that the disclosed inventive principles provide an efficient and effective way to accomplish attenuation of brake-induced vibration. While a presently preferred embodiment has been illustrated and described, it is to be appreciated that the invention may be practiced in various forms within the scope of the following claims.

What is claimed is:

1. A hydraulic brake system for braking a rotating object comprising:
    a brake that is operated by the displacement of hydraulic fluid from an actuator to the brake;
    and a damper for damping tactile vibration caused by pressure changes induced in the hydraulic fluid by an operational characteristic of the brake when the brake is braking the rotating object, wherein the damper is operatively coupled with a hydraulic brake line between the actuator and the brake by a T-connection and comprises;
    a housing comprising a bore,
    a piston that is displaceable within the bore and that divides the bore into a first chamber confronting one axial face of the piston and a second chamber confronting an opposite axial face of the piston;
    the housing comprising a port to which the T-connection communicates the brake line to communicate the hydraulic fluid to the first chamber such that increasing hydraulic fluid pressure is effective to displace the piston toward the second chamber;
    and a preloaded spring that is operated by displacement of the piston within the bore to resist piston displacement toward the second chamber as hydraulic fluid pressure increases and to aid piston displacement toward the first chamber as hydraulic fluid pressure decreases;
    the spring comprising an axial succession of individual frustoconical spring discs that are disposed in the second chamber and arranged to resiliently bias the piston against a shoulder of the bore in the first chamber;
    wherein preload force of the spring and mass of the piston are chosen to attenuate the hydraulic pressure changes that cause the tactile vibration; and
    including an adjustment mechanism for resiliently compressing the spring discs to establish the preload force in the spring.

2. A hydraulic brake system as set forth in claim 1 in which the adjustment mechanism comprises a stop that is disposed within the bore to force the spring discs axially against the piston, and an adjuster for adjusting the axial position of the stop within the bore.

3. A hydraulic brake system as set forth in claim 2 in which the adjuster comprises a screw that is threaded to a hole in an end cap that closes one end of the housing.

4. A hydraulic brake system as set forth in claim 1 in which the housing includes an orifice through which the port communicates with the first chamber.

5. A hydraulic brake system as set forth in claim 4 in which the orifice is disposed in a transverse wall of the housing, and the spring is arranged to resiliently bias the piston against the shoulder of the bore in the first chamber that circumscribes a cylindrical volume which is bounded axially by the transverse wall and the one axial face of the piston and to which the orifice is open when the piston is abutting the shoulder.

6. A hydraulic brake system as set forth in claim 1 in which the brake comprises a rotor that rotates with the rotating object and friction pads that are pressed against opposite faces of the rotor by displacement of hydraulic fluid from the actuator, wherein divergence of the opposite faces of the rotor from parallelism induces pressure changes in the hydraulic fluid that cause the tactile vibration when the friction pads are pressing against opposite faces of the rotor.

7. A hydraulic brake system as set forth in claim 6 including the rotating object, wherein that object is a motor vehicle wheel.

8. A method for attenuating tactile vibration caused by hydraulic fluid pressure changes induced in a hydraulic brake system by a characteristic of a hydraulic-operated brake when the brake is being actuated by an actuator to apply brake torque to a rotating object, the method comprising:
    communicating a damper to the hydraulic fluid by a T-connection to a hydraulic brake line between the actuator and the brake such that the hydraulic fluid can act on a face of a piston that is displaceable within a bore of the damper, and attenuating the vibration within a frequency range of interest by using a preloaded spring to resist piston displacement in one direction within the bore as hydraulic fluid pressure increases and to aid piston displacement in an opposite direction within the bore as hydraulic fluid pressure decreases, wherein the spring comprises an axial succession of individual frustoconical spring discs that are arranged to resiliently bias the piston against a shoulder of the bore and wherein preload force in the spring and mass of the piston are chosen to attenuate the hydraulic pressure changes that cause the tactile vibration; and
    resiliently compressing the spring discs to establish the preload force in the spring by adjusting an adjustment mechanism in the damper.

9. A method as set forth in claim 8 including communicating the hydraulic fluid to the face of the piston through an orifice in a transverse wall across the bore, and providing, proximate an outer perimeter of that transverse wall, the shoulder, against which an outer perimeter of the piston is resiliently biased by the spring discs.

10. A damper for damping tactile vibration caused by pressure changes induced in hydraulic fluid by an operational characteristic of a hydraulic-operated brake when the brake is braking a rotating object, the damper comprising:
    a housing comprising a bore;
    a piston that is displaceable within the bore and that divides the bore into a first chamber confronting one axial face of the piston and a second chamber confronting an opposite axial face of the piston;
    the housing comprising a port for communicating hydraulic fluid to the first chamber such that increasing hydraulic fluid pressure is effective to displace the piston toward the second chamber;

and a preloaded spring that is operated by displacement of the piston within the bore to resist piston displacement toward the second chamber as hydraulic fluid pressure increases and to aid piston displacement toward the first chamber as hydraulic fluid pressure decreases;

wherein the first chamber and the piston are constructed and arranged to close the first chamber except to the port, and wherein preload force in the spring and mass of the piston are chosen to attenuate the hydraulic pressure changes that cause the tactile vibration, the spring comprises an axial succession of individual frustoconical spring discs disposed in the second chamber and arranged to resiliently bias the piston against a shoulder of the bore in the first chamber, and an adjustment mechanism for resiliently compressing the spring discs to establish the preload force in the spring.

11. A damper as set forth in claim 10 in which the adjustment mechanism comprises a stop that is disposed within the bore to force the spring discs axially against the piston, and an adjuster for adjusting the axial position of the stop within the bore.

12. A damper as set forth in claim 11 in which the adjuster comprises a screw that is threaded to a hole in an end cap that closes one end of the housing.

13. A damper as set forth in claim 10 in which the housing includes an orifice through which the port communicates with the first chamber.

14. A damper as set forth in claim 13 in which the orifice is disposed in a transverse wall of the housing, and the spring is arranged to resiliently bias the piston against a shoulder of the bore in the first chamber that circumscribes a cylindrical volume which is bounded axially by the transverse wall and the one axial face of the piston and to which the orifice is open when the piston is abutting the shoulder.

* * * * *